United States Patent [19]

Das

[11] 3,964,936
[45] June 22, 1976

[54] COATING SOLUTION FOR METAL SURFACES
[75] Inventor: Narayan Das, Westmont, Ill.
[73] Assignee: Amchem Products, Inc., Ambler, Pa.
[22] Filed: Dec. 17, 1974
[21] Appl. No.: 533,644

Related U.S. Application Data
[63] Continuation-in-part of Ser. No. 429,779, Jan. 2, 1974, abandoned.

[52] U.S. Cl. .............................. 148/6.27; 148/26
[51] Int. Cl.² .................................... C23F 7/06
[58] Field of Search ........................ 148/6.27, 26

[56] References Cited
UNITED STATES PATENTS
| | | | |
|---|---|---|---|
| 1,710,743 | 4/1929 | Pacz | 148/6.27 |
| 3,682,713 | 8/1972 | Ries et al. | 148/6.27 X |
| 3,912,548 | 10/1975 | Faigen | 148/6.27 X |

Primary Examiner—Ralph S. Kendall
Attorney, Agent, or Firm—Synnestvedt & Lechner

[57] ABSTRACT

An acidic aqueous coating solution for forming on an aluminum surface a coating which is corrosion resistant and to which overlying coatings adhere excellently is disclosed. The coating solution contains compounds of zirconium and fluorine. The use of boric acid in the solution is disclosed also. The coating solution is capable of forming on an aluminum surface a uniformly colorless and clear coating so that the coated surface has the appearance of the underlying metal surface, that is, the coating can be formed without changing the appearance of the metal surface. When coating a shiny bright aluminum surface, there can be produced a coated surface having a uniformly shiny bright appearance which is maintained even after the coated surface is subjected to boiling water.

30 Claims, No Drawings

COATING SOLUTION FOR METAL SURFACES

CROSS-REFERENCE TO RELATED APPLICATION

This is a continuation-in-part of copending application Ser. No. 429,779, filed Jan. 2, 1974, now abandoned.

FIELD OF THE INVENTION

This invention relates to the application to aluminum surfaces of coatings which are corrosion resistant and to which overlying coatings such as those formed from paints, inks and lacquers adhere excellently. More particularly, this invention relates to aqueous coating solutions which form on aluminum surfaces the aforementioned types of coatings and coating solutions which are free of toxic materials such as chromates and ferricyanide.

It is known to coat aluminum surfaces with aqueous coating solutions that are effective in forming thereon coatings which are corrosion resistant and thereby protect the surface from degradation due to attack by corrosive materials. In general, the coatings formed from such coating solutions should also have properties such that overlying coatings which are applied thereto adhere tightly and strongly. such overlying coatings are decorative or functional in nature and are formed from materials such as paints, lacquers, inks, etc. (hereinafter referred to as "siccative coatings").

An example of an aluminum coating operation, and one in which the present invention has particularly good applicability, is the coating of aluminum cans. In general, the corrosion resistant and adherent coatings which are applied to aluminum cans should also be uniformly clear and colorless so that the coated cans have the bright shiny natural appearance of the underlying aluminum. This bright shiny natural appearance is desired in the final product even though portions of the can may be covered with colored paints or inks. (It is noted tht there are other aluminum coating operations in which it is desired that the corrosion resistant and adherent coating imparts to the aluminum surface a colored appearance, for example, a yellowish or green tint. However, this is not generally desired when coating aluminum cans.) Another specific property that coated aluminum cans should have is the ability to resist discoloration when the coated can is subjected to moderately hot water, for example, water having a temperature within the range of about 140°F to about 170°F. By way of background, it is noted that in certain applications, aluminum cans are so treated. (The can industry generally refers to this process as "pastuerization" of the cans.) This treatment has a tendency to cause an uncoated or even a coated aluminum surface to blacken or otherwise discolor thereby leaving the can with an unattractive appearance. In general, when the term "corrosion resistance" is used in connection with coatings for aluminum cans, it includes within its meaning that the coated surface resists blackening or other discoloration when exposed to the aforementioned hot water or boiling water treatment. The term corrosion resistance is so used herein unless otherwise specifically stated.

There are available presently coating solutions which form on aluminum surfaces uniformaly clear colorless coatings. One of the most widely used coating solutions, which forms such coatings, contains chromic acid, phosphoric acid and hydrofluoric acid. While such a coating solution is capable of forming coatings of the type desired, their use creates waste disposal problems because of the presence therein of hexavalent chromium, a very toxic material. It would be of great advantage to users of such coating solutions to have available coating solutions which do not contain hexavalent chromium.

This invention relates to the provision of an aqueous coating solutions which is free of hexavalent chromium and which is capable of forming on an aluminum surface a coating, including particularly a coating which is uniformly clear and colorless in appearance, and which is corrosion resistant and adheres excellently to overlying coatings.

REPORTED DEVELOPMENTS

There has been developed a number of types of aluminum coating solutions which are free of hexavalent chromium. Some of these coating solutions are reported to form colored coatings on aluminum surfaces. Other of the coating solutions are not capable of forming on aluminum surfaces coatings which have the desired properties of corrosion resistance and adherence to subsequently applied siccative coatings.

For example, U.S. Pat. No. 1,638,273 discloses an aqueous coating solution containing a soluble fluosilicate, a salt of a non-ferrous, iron-group metal and an alkali salt. The patent reports that the coatings formed from such coating solutions are mottled, speckeled or spotted in appearance. U.S. Pat. No. 1,710,743 discloses aqueous coating solutions containing double metal fluoride compounds such as sodium zirconium fluoride, zirconium titanium fluoride and potassium titanium fluoride. The coatings formed from such solutions are said to be of varying color (for example, grey, yellowish, golden, reddish and black), depending on the particular aluminum alloy being coated and the particular ingredients and amounts thereof comprising the solution. U.S. Pat. No. 2,276,353 discloses aqueous coating solutions containing hydrofluosilic acid ar salts thereof, an oxidizing agent and optionally an accelerating agent such as nitrate. The patent discloses the formation on aluminum surfaces of coatings which are grey, brown, white or reddish purple, depending on the specific ingredients and amounts thereof comprising the solution. In U.S. Pat. No. 3,160,506, there is disclosed an aqueous coating solution containing a transition metal fluoride which is said to be effective in forming on aluminum printing plates coatings which are stable under relatively high humidity and temperature conditions. There is no disclosure in this patent concerning the color of the coatings formed or the degree of corrosion resistance imparted by the coatings to the aluminum surface. U.S. Pat. No. 3,682,713 discloses an aqueous coating solution containing a complex fluoride (such as fluorides of boron, titanium, zirconium and iron), free fluoride ions, and an oxidizing agent such as sodium nitrobenzene sulfonate or nitrate. The patent discloses that the coatings formed on aluminum are dull-light-grey to light yellowish iridescent.

It is noted that there is disclosed in U.S. Pat. No. 3,066,055 coating solutions which are said to form on aluminum surfaces coatings which are colorless (or colored). The coating solutions contain fluorine compounds (including simple fluorides, complex fluorides, or double metal fluorides), along with hexavalent chromium, ferricyanide, molybdate or tungstate, and also a cation selected from elements 23 to 29 of the periodic table, that is, vanadium, chromium, manganese, iron, cobalt, nickel or copper. The patent discloses also that the pH of the coating solution can be varied with acids such as nitric, sulfuric or boric. It can be seen that the coating solution described in this patent contains various types of materials which create waste disposal problems. See also U.S. Pat. No. 2,825,697 which discloses an aqueous coating solution which forms on an aluminum surface coatings which are said to be substantially colorless. The coating composition described in this patent is an aqueous solution containing hexavalent chromium and a complex fluorine-bearing compound such as fluosilicic acid, fluoboric acid, fluozirconic acid, fluostannic acid, fluotitanic acid or soluble salts thereof.

In the overall picture, the aforementioned patents disclose aqueous coating solutions which contain hexavalent chromium or they disclose coating solutions which contain many essential ingredients, or they disclose coating solutions which are said to form colored coatings on aluminum surfaces.

Accordingly, it is an object of the present invention to provide a coating solution, free of hexavalent chromium, which will form on an aluminum surface a clear and colorless coating to provide a coated surface which resists blackening or other discoloration even after being subjected to boiling water.

BRIEF DESCRIPTION OF THE INVENTION

In accordance with the present invention, it has been found that aqueous coating solutions containing zirconium and fluorine compounds, such as fluozirconates, zirconium fluoride, or a mixture of water soluble compounds, at least one of which contains zirconium and the other of which contains fluoride, are effective in forming on aluminum surfaces uniformly clear colorless coatings which have corrosion resistant properties and provide bases to which overlying siccative coatings adhere well. The corrosion resistant properties of coatings formed from coating solutions within the scope of the present invention include the ability of the coating to withstand blackening or other discoloration when subjected to boiling water for a period of time of at least about 2 minutes, and as will be seen from examples reported below, solutions can be formulated which resist blackening or other discoloration when exposed to boiling water for as long as 15 minutes. It has been found also that the use of boron in the coating solution has certain advantages, as will be described in detail below.

The coating solution of the present invention is capable of effectively forming the aforementioned types of coatings on an aluminum surface in the absence of hexavalent chromium and accordingly, is free of this material and of materials which contain transition elements of the chromium subgroup of the Periodic Table, and also materials such as ferricyanide and ferrocyanide. Also, it is not necessary to add to the coating solution of the present invention materials, which if added, would mandate that effluents comprising the solution be treated specially before the effluent is discharged to the environment or to a sewage disposal plant. Some examples of such materials include manganese, cobalt, iron and nickel. An effluent containing zirconium need not be so treated.

DETAILED DESCRIPTION OF THE INVENTION

The coating solution of the present invention can be used to coat surfaces of pure aluminum or alloys of aluminum, for example, aluminum alloys containing minor amounts of metals such as, for example, magnesium, manganese, copper and silicon. Presently, two of the most popular alloys used in the aluminum can industry are aluminum alloys 3003 and 3004. It is believed that the coating solution of the present invention will be most widely used to coat aluminum surfaces which have a bright shiny appearance.

As mentioned above, there are conditions under which an aluminum surface, which is initially bright and shiny in appearance, has a tendency to darken or turn black, for example, when exposed to hot water. The following is believed to be an explanation of the cause of this.

Aluminum is generally covered with a thin, continuous, protective film of $Al_2O_3$, which is commonly known as a "barrier film". When Al is immersed into water, the outer surface of the $Al_2O_3$ film is hydroxylated to various hydroxides of aluminum in the following ways.

$$Al_2O_3 + H_2O \rightarrow 2AlOOH$$

$$AlOOH + H_2O \rightarrow Al(OH)_3$$

The mechanisms of the above reactions are believed to be as follows. During the initial stage of the reaction, a compact protonated film of AlOOH is formed on the outer surface of the $Al_2O_3$ barrier film, which always remains strongly adhered to the aluminum metal. During the reaction, $Al^{+++}$ ions from the underlying metal migrate across the $Al_2O_3$ film due to the potential gradient and concentration gradient of ions. The $Al^{+++}$ ions take up $OH^-$ ions at the oxide/electrolyte ($H_2O$) interface, leading to the formation of AlOOH according to the following reaction:

$$Al^{+++} + 3OH \rightarrow AlOOH + H_2O.$$

The AlOOH thus formed becomes a part of the compact film. Also, at the same time, protons ($H^+$ ions) in the hydrated oxide film diffuse inwardly and are replenished with $H^+$ ions from the electrolyte. Therefore, an upward change of pH in the electrolyte may be observed during the reaction.

As the reaction continues, the oxide film grows in thickness by the ionic migration mentioned above. The compact protonated oxide film ($Al_2O_3$ — AlOOH) reaches a limiting (steady-state) thickness, with the rate of diffusion of active $H^+$ and $Al^{+++}$ ions through the compact film equaling the rate of transformation of the outer layer, that is, the $Al(OH)_3$ film, as its total thickness becomes greater. The $Al(OH)_3$ film is formed by the hydration of AlOOH. As more $Al(OH)_3$ is formed, the continuity of $Al(OH)_3$ with the surface film is disturbed and the outer layer becomes colloidal in nature and porous. It is the reflection of light through this porous $Al(OH)_3$ film which gives the surface its darkened or blackened appearance.

Thus, two types of coatings are produced on an Al surface when it is subjected to water. The inner coating of $Al_2O_3$ — AlOOH is continuous and more compact. This coating is resistant to corrosion and an excellent base for anchoring paint, lacquer, etc. On the other hand, the outer Al(OH)$_3$ layer is composed of randomly oriented, loosely connected platelets. This porous layer has poor corrosion resistant and adhesive properties.

It is believed that the aforementioned problems caused by the Al(OH)$_3$ film are avoided by introducing zirconium and fluoride into the film. This is pictured as follows:

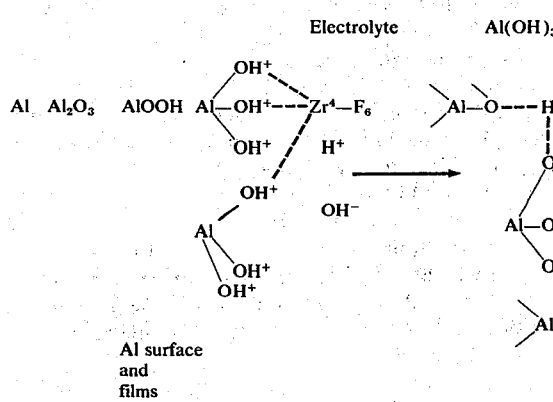

When zirconium is bonded to the hydrous alumina film, the formation on the surface of hydrated oxides of Al is prevented. The mechanism suggests that in H$_2$O, (OH)$^-$ ions become a part of the film structure, and the protons (H$^+$ ions) of the hydrated film diffuse inwardly because of the concentration gradient and potential gradient, and the H$^+$ ion is immediately replenished from the electrolyte. In K$_2$ZrF$_6$ electrolyte, it is believed that four such protons will be replaced by a single Zr$^{+4}$ ion, which in turn will reduce (OH)$^-$ ion concentration at the surface of the film. When the Zr becomes chemically bonded to the hydrated alumina film, the concentration gradient across the film of protons is reduced and the formation of Al(OH)$_3$ is prevented. This in turn improves the corrosion resistance of the film. This strong bonding of zirconium or its compounds to the Al surface takes place when the aluminum surface is subjected to the coating solution of the present invention. Auger Electron Spectrum analysis of coatings formed by the coating solution of the present invention has shown the presence of Zr, and also F in the coating. As will be seen in the test results reported below in the examples section, coating solutions of the present invention are capable of providing coated surfaces which are initially uniformly bright and shiny, and remain so when the coated aluminum surface is subjected to boiling water.

The acidic coating solution of the present invention can be prepared from water soluble fluozirconate compounds such as, for example, ammonium and alkali metal fluozirconates. The coating solution can also be prepared from zirconium fluoride (ZrF$_4$). In addition, the coating solutions can be prepared from a mixture of water/acid soluble compounds, one of which contains zirconium and the other of which contains fluoride. Examples of such compounds are zirconium nitrate, and zirconium sulfate, and hydrofluoric acid and water soluble salts thereof.

The effective amounts of zirconium/fluoride ingredients in the solution will depend on various factors such as the age of the solution, the temperature of the solution, the presence of boron, for example, added as H$_3$BO$_3$, the time of contact with the aluminum surface, spray pressure, etc. A freshly prepared coating solution having a pH of about 4 and containing as little as about 3 ppm of Zr and about 5 ppm of F, and applied by spraying at relatively high temperatures, for example, 130° to 150°F, can be used effectively. For a make-up bath to be used in an industrial operation, it is preferred that the coating solution contain at least about 50 ppm of Zr and at leat about 75 ppm of F. The upper limit on the amount of Zr is governed by its solubility in the solution, but the upper limit on the fluoride (including fluozirconate compounds) is governed by the amount at which the fluoride causes etching of the aluminum surface, which in turn tends to produce a dull and frosty surface. The concentration of F at which this occurs will depend on pH, temperature of application, contact time, etc. In general, it is recommended that the concentration of the F in a make-up bath be no greater than about 200 ppm.

It has also present found that advantages can be attained by having boron preset in the coating solution in dissolved form, added, for example, as boric acid, boric oxide or water soluble salts of boric acid, for example, ammonium and alkali metal borates. As mentioned hereinabove, Auger Electron Spectrum analysis of coatings formed by the coating solution of the present invention has shown the presence of zirconium in the coating. It has been found that the amount of zirconium in the coating can be greatly increased when the coatig solution contains boron. For example, in one coating of tests analyses showed relative zirconium intensity values of about 20 to about 50 times greater with the use of a coating solution containing boric acid than the values obtained with a solution that contained no boric acid.

In general, the boron should be present in the solution in an amount of at least about 10 ppm. Materials which are a source of boron such as, for example, boric acid, boric oxide and salts of boric acid which are soluble in the acidic aqueous coating solution should be used in amounts which are equivalent to at least about 10 ppm of boron. The upper concentration limit of boron is governed by the solubility of the materials which are the source in the acidic aqueous coating solution thereof. In general, amounts of boron in excess of about 200 ppm do not yield porportional increases in the properties desired. For good overall results, a preferred upper concentration limit of boron is about 125 ppm.

As to the pH of the coating solution of the present invention, if the solution is too acidic, the aluminum surface exposed thereto becomes etched and it has a gray to bluish haze, rather than the natural bright and shiny finish that is generally desired. A coating solution which is too acidic will cause a relatively large amount of aluminum to be dissolved. This leads to the formation of relatively large amounts of $Al(OH)_3$ on the aluminum surface. As mentioned above, it is believed that $Al(OH)_3$ is the cause of an aluminum surface having poor adhesive properties and blackening after it is subjected to boiling water. On the other hand, the acidity of the solution should be high enough for the zirconium to remain in the coating solution in dissolved form. In general, it has been found that the coating solution of the present invention should have a pH within the range of about 3 to about 5 in order for the solution to form colorless clear coatings and to maintain the zirconium in dissolved form in the solution.

If it is desired to adjust the pH of the coating solution, it is much preferred to do so by adding nitric acid. Problems can be encountered if an acid such as phosphoric is used because it tends to precipitate the zirconium from the solution as zirconium phosphate. The use of hydrofluoric acid to adjust pH can lead to problems because it is difficult to control pH adjustment with this material, and it can tend to pit and attack the aluminum surface. Nevertheless, it may be desirable to add HF to a worked bath of the coating solution to complex aluminum that is dissolved during coating formation. Suitable amounts of HF can be added to perform this function while avoiding the use of amounts which tend to pit the aluminum surface. For example, a worked bath can contain up to 1000 ppm or more of F.

The coating solution can be applied to the aluminum surface by any suitable method. For example, the solution can be applied by spraying the aluminum surface, or the aluminum surface can be immersed in the solution, or it can be applied by flow-coating techniques. It is believed that the solution can be applied very economically and effectively by spraying.

The temperature of the coating solution should be such that the zirconium is chemically bonded to the aluminum hydrated oxide latice. In general, the temperature of the solution should be in excess of about 100°F to effect this. Preferably, the coating solution should have a temperature of about 120°F to about 150°F. Temperatures in excess of about 160°F tend to produce a dull frosty surface.

The desired coatings can be formed by contacting the coating solution and the aluminum surface for at least about 15 seconds. In general, the lower the temperature of the coating solution, the longer should be the contact time. The higher the temperature of the solution, the shorter the contact time required. In general, it will be unnecessary to contact the surface with the coating solution for more than 1 minute.

Prior to applying the coating solution to the aluminum surface, the surface should be subjected to cleaning solutions which leave the surface very clean. Available acid or alkaline cleaners can be used. After subjecting the surface to the cleaning operation, it should be water rinsed. Also, after the coating solution has been applied to the aluminum surface, it should be water rinsed, including a deionized water rinse. Rinsing with water that contains a small amount of metal can lead to a coating which has poor adhesive properties. In utilizing the present invention to coat aluminum cans, it is not necessary to rinse the coated surface with final rinse solutions such as, for example, hexavalent Cr final rinse solutions, hexavalent Cr/reduced Cr final rinse solutions or phosphate rinse solutions.

After the coated surface has been water rinsed, the coating should be dried. This can be done conveniently in an oven having forced circulation of hot air. Other available drying methods can be used.

After the coating has been dried, it can be subjected to sanitary lacquering or to decorative operations which can include applying to the coated surface decorative lacquer, ink or resin coatings.

In general, after the cans have been decorated, they are subjected to pasteurization conditions.

As mentioned above, it appears that subjecting an aluminum surface to the solution of the present invention modifies the surface in such a way that Zr is chemically bonded to aluminum hydrated oxides. A series of tests have shown the formation of coatings having a thickness within the range of about 200 to about 750A and a weight within the range of about 10 to about 35 mg/sq.ft. with the zirconium comprising about 5 to about 35 wt. % of the coating. The figures are presented for illustrative purposes.

EXAMPLES

Examples below are illustrative of the practice of the present invention. Comparative examples are set forth also.

Unless stated otherwise, the Al surfaces treated with the solutions identified in the examples were drawn and ironed Al can surfaces which were first degreased, as necessary, in a mild aqueous alkaline cleaner (comprising about 25 wt. % sodium tripolyphosphate, about 58 wt. % borax, about 4 wt. % of sodium gluconate and the remainder being other surface active agents), rinsed with tap water and then cleaned by spraying in a hot aqueous sulfuric acid cleaner and finally rinsed with tap water. The can surfaces were bright and shiny in appearance. After treatment with the solutions identified in the examples, the treated Al surface was rinsed in deionized water and dried in an oven for 2 minutes at 400°F.

Thereafter, the treated Al cans were tested for corrosion resistance according to a test commonly used and referred to in the can industry as the "pasteurization test". This consisted of immersing the Al cans in boiling tap water for 15 minutes. A cleaned-only Al surface having thereon a naturally formed $Al_2O_3$ film turns black in a few minutes. It will be seen from examples set forth below that prior treatment of the Al surfaces with coating solutions of the present invention resulted in the provision of coated surfaces which were not blackened or otherwise discolored. The phrase "no blackening" is used to identify coated aluminum surfaces which after subjection to the pasteurization test are uniformly bright and shiny in appearance, the coatings of said surfaces being uniformly clear and colorless.

Aluminum cans treated in accordance with the solutions described in the examples were tested also for paint adhesion. After the cans were dried and described above, the coated surface was painted with a white base coat (No. 5007-L white modified acrylic, sold by Celanese), and thereafter baked in an oven for 1 minute. The painted cans were then immersed in boiling 1% detergent (Joy solution) for 30 minutes. Immediately after removing the painted cans from the detergent solution, they were rinsed in water, and the excess water was removed from the surface by wiping.

The painted cans were then cross-hatched and taped and tested for paint adhesion. This included applying cellophane tape firmly over the cross-hatched area and then drawing the tape back against itself with a rapid pulling motion such that the tape was pulled away from the cross-hatched area. The test is rated "excellent" when the tape does not peel any paint from the surface. Otherwise it is rated "fail", "fair" or "good", depending upon the amount of paint peeled from the surface.

In the first group of examples, Al cans were treated with acidic aqueous solutions containing potassium fluozirconate ($K_2ZrF_6$) in the amounts indicated in Table 1 below and having a pH as indicated. Boric acid was added to some of the solutions as indicated in Table 1. Each of the Al cans were sprayed with the various coating solutions used for a period of 45 seconds. The temperatures of the coating solutions are given in Table 1. The coating solutions contained $HNO_3$ also, in amounts which imparted to the solutions the pHs indicated.

TABLE 1

| Ex. No. | $K_2ZrF_6$, g/l | Boric Acid g/l | pH | Temp. of Solution, °F | Pasteurization Test | Paint Adhesion Test |
|---|---|---|---|---|---|---|
| 1 | 0.1 | None | 3.7 | 110 | Slight blackening | Fair |
| 2 | 0.1 | None | " | 130 | Very slight blackening | Good |
| 3 | 0.1 | None | " | 150 | Very slight blackening | Good |
| 4 | 0.1 | 1.0 | 3.8 | 110 | No blackening | Excellent |
| 5 | 0.1 | 1.0 | " | 130 | No blackening | Excellent |
| 6 | 0.1 | 1.0 | " | 150 | No blackening | Excellent |
| 7 | 0.2 | None | " | 110 | No blackening | Excellent |
| 8 | 0.2 | None | " | 130 | No blackening | Excellent |
| 9 | 0.4 | None | 3.9 | 110 | No blackening | Excellent |
| 10 | 0.4 | None | " | 130 | No blackening | Excellent |
| 11 | 0.2 | 1.0 | 3.7 | 110 | No blackening | Excellent |
| 12 | 0.2 | 1.0 | " | 130 | No blackening | Excellent |
| 13 | 0.4 | 3.0 | 3.8 | 110 | No blackening | Excellent |
| 14 | 0.4 | 3.0 | " | 130 | No blackening | Excellent |

The coatings formed from the coating solutions identified in Table 1 were uniformly clear and colorless and the coated surfaces were bright and shiny in appearance. Thus, the coatings were formed without changing the bright and shiny appearance of the aluminum surface. From Table 1, it can be seen that the use of potassium fluozirconate in the amount of 0.1 g/l at the conditions stated forms coatings which tend to blacken when subjected to the pasteurization test (Example Nos. 1–3). On the other hand, Example Nos. 4–6 show that the use of boric acid along with 0.1 g/l of potassium fluozirconate gives coatings which do not blacken and which have improved paint adhesive properties. Examples 7–10 show that the use of amounts of potassium fluozirconate in excess of 0.1 g/l gives, under the conditions stated, coatings which have excellent corrosion resistance and paint adhesion. Example Nos. 11–14 show that the use of higher concentrations of potassium fluozirconate masks the effect of the boric acid.

The next group of examples shows the effect of the continued use of a coating solution of the present invention on the pH of the solution. Four liters of coating solution containing the ingredients set forth below were used in this series of tests.

EXAMPLE 15

| | |
|---|---|
| $K_2ZrF_6$ | 0.4 g/l |
| $H_3BO_3$ | 5.0 g/l |
| $KNO_3$ | 10.0 g/l |
| $HNO_3$(4N) | 0.4 ml/l |

Aluminum cans were each sprayed for 45 seconds with the above coating solution which was heated and maintained at a temperature of 130°F. Excess coating solution which did not remain on the cans was collected and recycled to the coating bath from which solution was drawn during the spray operation. A pH monitor was set up in the bath to record the pH. Table 2 below identifies the pH of the bath after the stated number of cans were treated. The results of subjecting the cans to the pasteurization test are reported also in Table 2.

Table 2

| Can Number | pH | Pasteurization Test |
|---|---|---|
| 1 | 4.20 | No blackening |
| 6 | 4.70 | No blackening |
| 10 | 4.90 | Slight blackening |
| 12 | 4.99 | Slight blackening |
| 16 | 5.01 | Slight blackening |
| 22 | 5.20 | Slight blackening |
| 28 | 5.30 | Slight blackening |

From Table 2 above, it can be seen that as the bath of coating solution is used, hydrogen ion is consumed and the pH of the solution rises, thus indicating that hydrogen ion is consumed during the reaction of the coating solution with the aluminum surface. As the pH rises, potassium fluozirconate begins to precipitate and the coating solution becomes cloudy. Precipitation of the potassium fluozirconate decreases the activity of the coating solution which then tends to produce coated surfaces which tend to blacken when subjected to the pasteurization test. This can be avoided by replenishing the solution with fluozirconate and/or acid such as nitric in amounts which lower the pH to within the aforementioned range.

The following coating solution was used to coat aluminum surfaces in accordance with the present invention.

EXAMPLE 16

| | |
|---|---|
| potassium fluozirconate | 0.4 g/l |
| boric acid | 5.0 g/l |
| potassium nitrate | 10.0 g/l |

The above coating solution, which had a pH of 4 and a temperature of 120°F, was sprayed onto an aluminum can surface for a period of 45 seconds. The Auger Electron Spectrum of the coated surface showed that the coating formed from the above coating solution contained mainly Zr, F, $Al_2O_3$ and Ca, apparently from the tap water from which the solution was prepared, with some superficial carbon peak.

EXAMPLE 17

As has been noted, boric acid, can be used to advantage in the coating solution of the present invention. For comparative purposes, the group of comparative test examples reported below shows the use of a treatment solution containing boric acid and sodium nitrate, but no zirconium or fluoride, in treating aluminum cans which were subjected subsequently to the pasteurization and paint adhesion tests. The amount of treatment solution prepared was 1 liter and it contained 0.1 M boric acid and 0.1 M sodium nitrate. The solution was evaluated at different pHs, identified in Table 3 below. The pH of the originally made-up solution was 7.2. It was thereafter varied by the addition thereto of nitric acid in an amount to give the pH values set forth in Table 3. Table 3

| Treatment Time, in Sec. | pH | Temperature °F | Pasteurization Test | Paint Adhesion Test |
| --- | --- | --- | --- | --- |
| Control | (No Treatment) | — | Dark brown or black | Fail |
| 45 | 7.2 | 120 | Slightly yellow | Fail |
| 45 | 7.2 | 170 | Slightly yellow | Fail |
| 45 | 6.2 | 120 | Slightly yellow | Fail |
| 45 | 6.2 | 170 | Slightly yellow | Fail |
| 45 | 3.2 | 120 | Slightly yellow | Fail |
| 45 | 3.2 | 170 | Slightly yellow | Fail |

With respect to the use of a treatment solution containing boric acid and sodium nitrate, it has been known heretofore that a boric acid solution can be used to form a barrier type anodic oxide film on aluminum by electrochemical reactions. Also, it has been reported heretofore that a solution containing borate and nitrate is effective in increasing the corrosion resistance of such a film in that it contributes to surface area decrease in the compact region of the oxide film. (See "Some Physical and Dielectric Properties of Hydrous Alumina Films", by Alwitt, R. S., *J. Electrochem. Soc.*, Volume 118, page no. 1730, 1971). However, it can be seen from the test results reported in Table 3 that such treatment solutions are not capable of imparting to an aluminum surface coatings which have the corrosion resistance and paint adhesion of the type provided by the use of coating solutions of the present invention.

It is noted also that treatment solutions of the type described in Table 3 were modified by the addition thereto of fluoride, the source of which was ammonium bifluoride, sodium fluoride, or sodium bifluoride. (The modified solutions, as the solutions identified in Table 3, contained no zirconium). Coatings formed on aluminum surfaces from the modified solutions were translucent or even milky in appearance, and the coated surfaces did not have the bright appearance that was originally possessed by the uncoated metallic aluminum surfaces. In addition, the coated surfaces turned yellow when subjected to the pasteurization test. And the treated aluminum surfaces gave very poor results when subjected to the paint adhesion test.

The next group of examples shows the use of treatment solutions containing metal fluoride compounds, other than zirconium compounds, as well as coating solutions containing zirconium and fluoride. In addition to the ingredients set forth in Table 4 below, each solution contained nitric acid in an amount sufficient to impart to each of the solutions a pH of 4. Each solution, which had a temperature of 130°F, was sprayed onto an aluminum surface for a 40 second period. The results of subjecting the aluminum surfaces to the pasteurization test are reported in Table 4 also.

Table 4

| Ex. No. | Ingredient | Amount, g/l | Boric Acid, g/l | Pasteurization Test |
| --- | --- | --- | --- | --- |
| 18 | $K_2TiF_6$ | 0.4 | None | Very slight blackening |
| 19 | $K_2TiF_6$ | 0.4 | 5.0 | Very slight blackening |
| 20 | $K_2SiF_6$ | 0.4 | None | Very slight blackening |
| 21 | $K_2SiF_6$ | 0.4 | 5.0 | Very slight blackening |
| 22 | $K_3SbF_6$ | 0.4 | None | Slight blackening |
| 23 | $K_3SbF_6$ | 0.4 | 5.0 | Slight blackening |
| 24 | $KBF_4$ | 1.0 | None | Almost no blackening |
| 25 | $KBF_4$ | 1.0 | 5.0 | Almost no blackening |
| 26 | $ZrF_4$ | 0.4 | None | No blackening |
| 27 | $Zr(NO_3)_4$ | 0.4 | None | Blackening |
| 28 | $Zr(NO_3)_4$ and HF, 25 ppm | 0.4 | None | No blackening |

With respect to the solutions identified in Table 4 above, it is noted that the use of each of the solutions resulted in a treated surface which was bright and shiny like the untreated surface, except for the use of the solutions containing potassium titanium fluoride which resulted in treated surfaces having a light bluish tinge. From the results reported in Table 4, it can be seen tha although all of the solutions improved the corrosion resistance of the aluminum surface, the coating solutions containing both zirconium and fluoride gave the most significant improvement.

Coating solutions of Examples 29 and 30 below were also used to treat aluminum cans (see Examples 1 and 2 respectively in U.S. Pat. No. 3,682,713).

EXAMPLE 29

| | |
| --- | --- |
| $NaBF_4$ | 1.5 g/l |
| $NaNO_3$ | 4.0 g/l |
| sodium m-nitrobenzene sulfonate | 4.5 g/l |
| $Zn(NO_3)_2 \cdot 6H_2O$ | 0.2 g/l |

The pH of the solution was adjusted to 6.6 and the solution, at a temperature of 35°C, was sprayed onto an aluminum can for a 2 minute period. The coated can surface blackened when subjected to the pasteurization test.

The coating solution of Example 30 was as follows.

| | |
| --- | --- |
| $(NH_4)_2ZrF_6$ | 1.5 g/l |
| $NaNO_3$ | 26.0 g/l |
| $Co(NO_3)_2 \cdot 6H_2O$ | 0.5 g/l |
| sodium m-nitrobenzene sulfonate | 1.0 g/l |

The above solution, which had a pH of 5.2 and a temperature of 70°C, was sprayed onto an aluminum surface for a 30 second period. The coating formed from the solution was colorless and clear, and the bright and shiny coated surface did not blacken when subjected to the pasteurization test. However, it can be seen that the above solution contains cobalt. It is noted also that the use and application of a solution as described in Example 30, except that the solution did not contain ammonium zirconium fluoride, resulted in a coated aluminum surface which blackened heavily when subjected to the pasteurization test.

EXAMPLE 31

Clear and colorless coatings have been attained by spraying for 30 seconds bright and shiny aluminum can surfaces with the coating solution described below at a temperature of 130°F.

| | |
|---|---|
| $(NH_4)_2ZrF_6$ | 0.3 g/l |
| $H_3BO_3$ | 0.062 g/l |
| $HNO_3$ | to impart a pH of 4.2 |
| water | to make up 1 liter |

Electron Probe Analysis of a coated surface produced as described above showed a relative zirconium intensity value of about 1000 as compared to a value of about 50 for a coated surface produced in the same way except that the coating solution used did not contain boric acid.

From examples set forth above, it can be seen that the present invention provides a coating solution free of hexavalent chromium and one which is capable of forming on an aluminum surface a colorless and clear coating without modifying the appearance of the aluminum surface. The coated surface resists discoloration even after being subjected to boiling water and has excellent adhesion to overlying siccative coatings.

I claim:
1. An acidic aqueous coating solution having a pH within the range of about 3 to about 5 and consisting essentially of at least about 3 ppm of zirconium, fluoride in an amount of at least about 5 ppm and less than an amount which causes etching of an aluminum surface to the extent that the surface has a dull and frosty appearance and boric acid, a water soluble salt of boric acid or boric oxide in an amount such that the concentration of boron is at least about 10 ppm, wherein said solution is capable of forming on an aluminum surface having a bright and shiny appearance a coating, the coated surface having said bright and shiny appearance and resisting blackening after the coated surface is subjected to boiling water for a 15 minute period, and wherein said solution is free of hexavalent chromium, ferroand ferricyanide, and any materials which contain a transition element of the chromium subgroup of the Periodic Table.

2. A coating solution according to claim 1 wherein the amount of each of said fluoride and boron is no greater than about 200 ppm.

3. A coating solution according to claim 2 wherein the amount of zirconium is at least about 50 ppm, the amount of fluoride is at least about 75 ppm, and the amount of boron is no greater than about 125 ppm.

4. A coating solution according to claim 1, including also nitric acid.

5. A coating solution according to claim 4 wherein the source of said zirconium is ammonium fluozirconate.

6. A coating solution according to claim 1 including about 0.1 to about 0.4 g/l of $K_2ZrF_6$, about 10 to about 125 ppm of boron added as $H_3BO_3$ and nitric acid in an amount such that the pH of the solution is within the range of about 3 to about 5.

7. A method for applying a uniformly clear and colorless coating on a bright shiny aluminum surface comprising contacting said surface with the coating solution defined in claim 1 and forming said coating to provide a bright shiny coated aluminum surface.

8. A method for coating aluminum can stock comprising contacting an aluminum can surface having a bright and shiny appearance with an acidic aqueous coating solution having a pH within the range of about 3 to about 5 and consisting essentially of zirconium and fluoride, the amount of zirconium being at least about 3 ppm and the amount of fluoride being at least 5 ppm and less than an amount which causes etching of said surface to the extent that the surface has a dull and frosty appearance, reacting said zirconium with said surface to chemically bond said zirconium to said surface and forming on said surface a coating, the coated surface having said bright and shiny appearance and resisting blackening after the coated surface is subjected to boiling water for 15 minutes, and wherein said coating solution is free of hexavalent chromium, ferroand ferricyanide, and any material which contains a transition element of the chromium subgroup of the Periodic Table.

9. A method according to claim 8 wherein said solution includes nitric acid.

10. A method according to claim 8 wherein the amount of zirconium is at least about 50 ppm and the amount of fluoride is at least about 75 ppm.

11. A method according to claim 8 wherein said coating solution includes also at least about 10 ppm of boron.

12. A method according to claim 11 wherein said solution includes nitric acid.

13. A method according to claim 11 wherein the coating solution includes boric acid, a water soluble salt of boric acid or boric oxide.

14. A method according to claim 8 wherein the temperature of the coating solution is about 120°F to about 150°F.

15. A method according to claim 14 wherein said solution is sprayed on said surface.

16. A method according to claim 15 wherein said solution consists essentially of about 0.1 to about 0.4 g/l of $K_2ZrF_6$, about 10 to about 125 ppm of boron added as $H_3BO_3$ and nitric acid.

17. A method according to claim 8 wherein said coating solution consists essentially of at least about 50 ppm of zirconium, about 75 to about 200 ppm of fluoride, about 10 to about 125 ppm of boron added as boric acid and nitric acid.

18. A method according to claim 17 wherein the source of said zirconium is ammonium fluozirconate.

19. A method according to claim 8 including adding fluoride to said solution to complex aluminum that is dissolved during coating formation.

20. A method according to claim 8 and including pasteurizing the surface having said coating thereon.

21. An acidic aqueous coating solution having a pH of about 3 to about 5 and consisting essentially of zirconium, fluoride, and boron, the amount of zirconium being at least about 3 ppm, the amount of fluoride being within the range of about 5 to about 200 ppm, and the amount of boron being within the range of about 10 to about 200 ppm, wherein said solution is capable of forming on an aluminum surface having a bright and shiny appearance a coating, the coated surface having said bright and shiny appearance and resisting blackening after the coated surface is subjected to boiling water for a 15-minute period, wherein said solution is free of hexavalent chromium, ferro- and ferricyanide and any materials which contain a transition element of the chromium subgroup of the Periodic Table.

22. A coating solution according to claim 21 wherein the source of said boron is boric acid, a water soluble salt of boric acid or boric oxide.

23. A method for producing a coated aluminum surface having a bright and shiny appearance comprising spraying a bright shiny aluminum surface with the coating solution defined in claim 22 at a temperature within the range of about 120° to about 150°F.

24. A method for producing a coated aluminum surface having a bright and shiny appearance comprising spraying a bright shiny aluminum surface with the coating solution defined in claim 21 at a temperature within the range of about 120° to about 150°F.

25. An acidic aqueous coating solution consisting essentially of a complex fluoride of zirconium in an amount such that the concentration of zirconium is at least about 3 ppm and the amount of fluoride is at least about 5 ppm and less than an amount which causes etching of an aluminum surface to the extent that the surface has a dull and frosty appearance, about 10 to about 200 ppm of boron added as boric acid, a water soluble salt of boric acid, or boric oxide, and nitric acid in an amount such that the pH of the solution is within the range of about 3 to about 5, wherein said solution is capable of forming on an aluminum surface having a bright and shiny appearance a coating, the coated surface having said bright and shiny appearance and resisting blackening after the coated surface has been subjected to boiling water for a 15 minute period and wherein said solution is free of hexavalent chromium, ferro- and ferricyanide, and any materials which contain a transition element of the chromium subgroup of the Periodic Table.

26. A coating solution according to claim 25 wherein the amount of fluoride is no greater than about 200 ppm.

27. A coating solution according to claim 25 wherein the amount of zirconium is at least about 50 ppm, the amount of fluoride is at least about 75 ppm, and the amount of boron is no greater than about 125 ppm.

28. A method for producing a coated aluminum surface having a bright and shiny appearance comprising spraying a bright shiny aluminum surface with the coating solution defined in claim 25 at a temperature within the range of about 120° to about 150°F.

29. An acidic aqueous coating solution consisting essentially of a complex fluoride of zirconium, in an amount such that the concentrations of zirconium and fluoride are equal to the concentration of zirconium and fluoride in a solution containing about 0.1 to about 0.4 g/l of $K_2ZrF_6$, about 10 to about 125 ppm of boron added as boric acid, a water soluble salt of boric acid or boric oxide, and nitric acid in an amount such that the pH of the solution is within the range of about 3 to about 5, wherein said solution is capable of forming on an aluminum surface having a bright and shiny appearance a coating, the coated surface having said bright and shiny appearance and resisting blackening after the coated surface has been subjected to boiling water for a 15 minute period, and wherein said solution is free of hexavalent chromium, ferro- and ferricyanide and any materials which contain a transition element of the chromium subgroup of the Periodic Table.

30. A method for treating an aluminum surface having a bright and shiny appearance comprising contacting said surface with an acidic aqueous coating solution having a pH with the range of about 3 to about 5 and consisting essentially of zirconium and fluoride, the amount of zirconium being at least about 3 ppm and the amount of fluoride being at least 5 ppm and less than an amount which causes etching of said surface to the extent that the surface has a dull and frosty appearance, reacting said zirconium with said surface to chemically bond said zirconium to said surface and forming on said surface a coating, the coated surface having said bright and shiny appearance and resisting blackening after the coated surface is subjected to boiling water for 15 minutes, and wherein said coating solution is free of hexavalent chromium, ferro- and ferricyanide, and any material which contains a transition element of the chromium subgroup of the Periodic Table, and pasteurizing the surface having said coating thereon.

* * * * *